United States Patent
Wei et al.

(10) Patent No.: US 8,162,513 B2
(45) Date of Patent: Apr. 24, 2012

(54) ILLUMINATION DEVICE WITH ANTI-GLARE PLATE

(75) Inventors: An-Chi Wei, Miao-Li Hsien (TW); Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 270 days.

(21) Appl. No.: 12/621,636

(22) Filed: Nov. 19, 2009

(65) Prior Publication Data

US 2010/0284174 A1 Nov. 11, 2010

(30) Foreign Application Priority Data

May 6, 2009 (CN) .......................... 2009 1 0302129

(51) Int. Cl.
*F21V 5/00* (2006.01)

(52) U.S. Cl. .............. 362/311.06; 362/147; 362/311.02; 362/331; 362/320

(58) Field of Classification Search ............. 362/311.01, 362/311.02, 311.03, 147, 619, 620, 628, 362/330, 331, 311.05, 311.06, 576
See application file for complete search history.

(56) References Cited

U.S. PATENT DOCUMENTS

| | | | | |
|---|---|---|---|---|
| 2,318,716 A * | 5/1943 | Rolph | ........................... | 362/223 |
| 3,009,054 A * | 11/1961 | Thomas | ........................... | 362/223 |
| 5,228,773 A * | 7/1993 | Win | ........................... | 362/339 |
| 6,435,691 B1 * | 8/2002 | Macey et al. | ........................... | 362/101 |
| 6,871,983 B2 * | 3/2005 | Jacob et al. | ........................... | 362/364 |
| 7,408,708 B2 * | 8/2008 | Goto et al. | ........................... | 359/456 |
| 7,614,769 B2 * | 11/2009 | Sell | ........................... | 362/365 |
| 7,686,470 B2 * | 3/2010 | Chiang | ........................... | 362/147 |
| 7,806,567 B2 * | 10/2010 | Chen | ........................... | 362/311.06 |
| 7,810,983 B2 * | 10/2010 | Chang | ........................... | 362/628 |
| 7,819,570 B2 * | 10/2010 | Chang | ........................... | 362/628 |
| 7,862,192 B2 * | 1/2011 | Chang | ........................... | 362/97.3 |
| 7,997,780 B2 * | 8/2011 | Chang | ........................... | 362/555 |
| 2007/0097709 A1 * | 5/2007 | Hsieh | ........................... | 362/620 |

FOREIGN PATENT DOCUMENTS

CN 201141550 Y 10/2008
CN 101338874 A 1/2009

* cited by examiner

*Primary Examiner* — John A Ward
(74) *Attorney, Agent, or Firm* — Altis Law Group, Inc.

(57) ABSTRACT

An exemplary illumination device includes a solid-state light source and an anti-glare plate. The solid-state light source is configured for generating light, and the solid-state light source defines a central axis. The anti-glare plate is arranged correspondingly generally adjacent to the solid-state light source. The plate includes an incident surface and an output surface at opposite sides thereof. The output surface has parallel micro-structures each have a length parallel to a first reference axis, and the micro-structures is arranged in two groups at opposite sides of the central axis. The micro-structures are configured for contracting a radiating range of the light entering the plate. Such contraction is along respective opposite directions of a second reference axis, and the second reference axis is substantially perpendicular to the first reference axis.

12 Claims, 7 Drawing Sheets

ILLUMINATION DEVICE WITH ANTI-GLARE PLATE

BACKGROUND

1. Technical Field

The disclosure generally relates to illumination devices, and particularly to an illumination device having an anti-glare plate.

2. Description of Related Art

Nowadays, light emitting diodes (LEDs) are extensively used as light sources due to their high luminous efficiency, low power consumption and long lifespan. Although LEDs can emit bright light to illuminate a dark environment, when bright light from the LEDs directly enters a person's eyes, he/she is liable to experience uncomfortable glare. For example, as shown in FIG. 7, in a typical application of the LEDs 10, the LEDs 10 are arranged on a ceiling to provide overhead lighting. Because the LEDs 10 emit light radially, a person is liable to directly view light from those LEDs 10 which are in a range or purview from about 45 degrees to about 85 degrees, as measured from the vertical. The person may thus suffer from glare. Glare can cause eye strain and fatigue, and may lead to headaches and other discomfort.

Therefore, what is needed is an illumination device that overcomes the described limitations.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views, and all the views are schematic.

DETAILED DESCRIPTION

Embodiments of the invention will now be described in detail below, with reference to the drawings.

Figure 1:
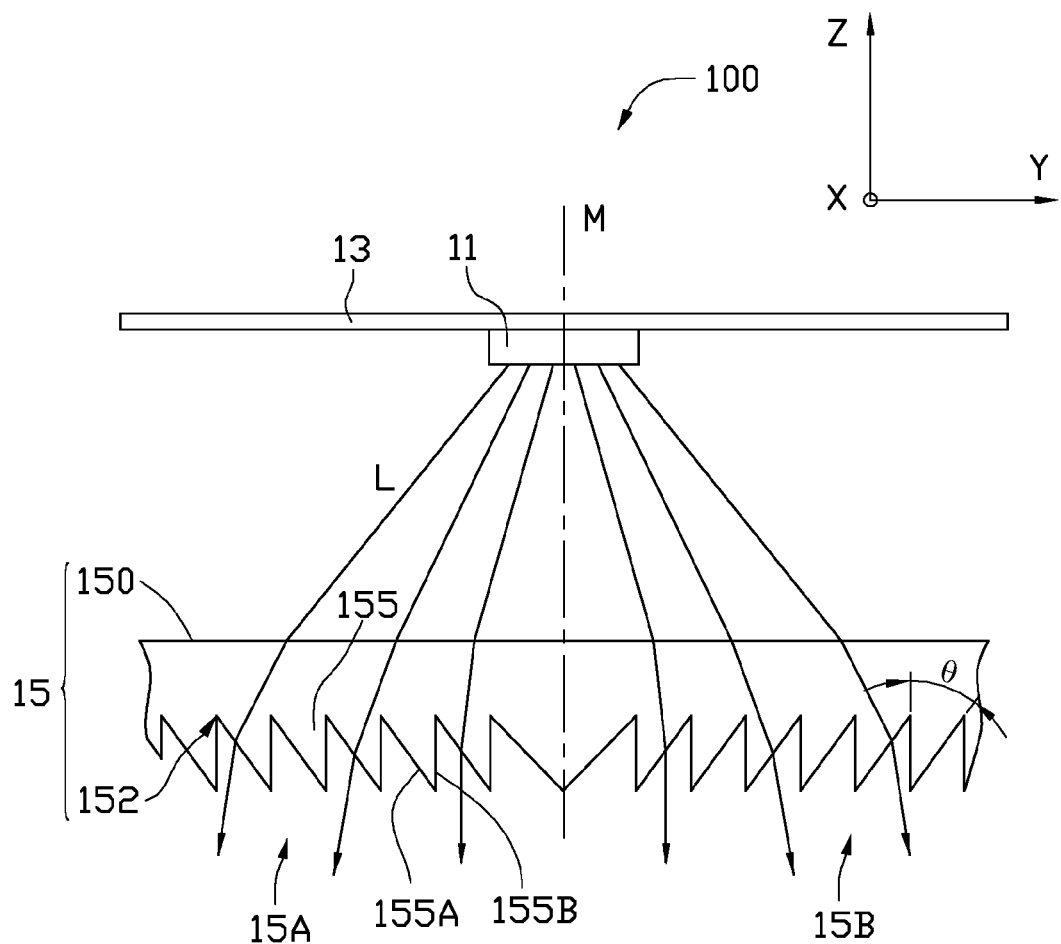
FIG. 1 is a side view of part of an illumination device, according to a first embodiment, the illumination device including an LED and an anti-glare plate.

Referring to FIG. 1, an illumination device 100, according to a first embodiment, is shown. The illumination device 100 has anti-glare function, and includes a solid-state light source 11 and an anti-glare plate 15.

Figure 2:
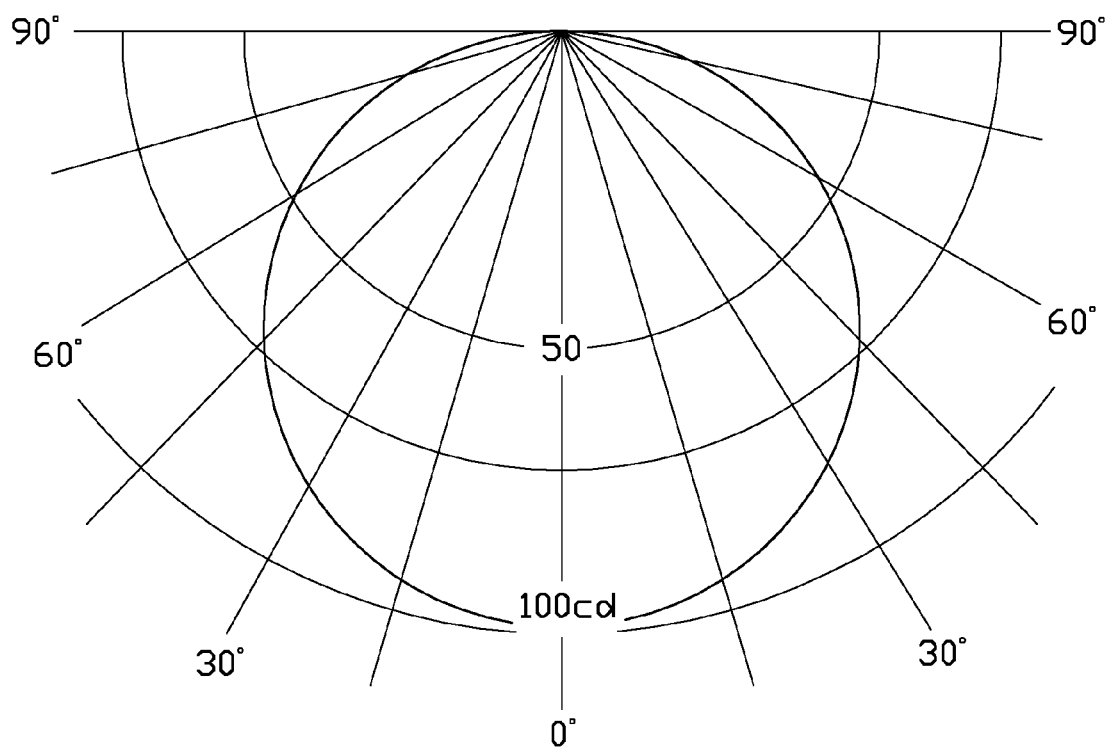
FIG. 2 is a diagram illustrating light intensity distribution of the LED of FIG. 1 before the light passes through the anti-glare plate.

The solid-state light source 11 may for example be an LED or an LED chip. In this embodiment, the solid-state light source 11 is an LED 11 providing a Lambertian light intensity distribution, as illustrated in FIG. 2. The Full Width at Half Maximum (FWHM) of the LED 11 is in a range from about 0 degrees to about 60 degrees, and also in a range from about 300 degrees to about 360 degrees. That is, the FWHM of the LED is about 120 degrees. The LED 11 defines a central axis M, which passes through the plate 15. The central axis M is parallel to a Z-axis of a defined Cartesian coordinate system, as shown in FIG. 1. The illumination device 100 may further include a substrate 13; thereby, the LED 11 can be secured on the substrate 13. The substrate 13 may for example be a circuit board.

In the illustrated embodiment, the plate 15 has a generally cuboid shape. The plate includes an incident surface 150 and an output surface 152 at opposite sides thereof. The incident surface 150 is a planar surface, and the incident surface 150 and the output surface 152 are substantially parallel with one another. The incident surface 150 faces the LED 11. The plate 15 can be made of transparent or light-pervious material, such as glass, resin, silicone, epoxy, polyethylene terephthalate, polymethyl methacrylate or polycarbonate. Alternatively, the plate 15 can be made of other suitable transparent or light-pervious material.

The plate 15 defines a plurality of micro-structures 155 thereon. Each of the micro-structures 155 extends along a direction parallel to an X-axis of the Cartesian coordinate system. The X-axis is perpendicular to the Z-axis. All the micro-structures 155 are parallel with one another, and adjoin one another. In the illustrated embodiment, each of the micro-structures 155 is an elongate protrusion, which extends outwardly from the output surface 152 of the plate 15. In one embodiment, the micro-structures 155 can be provided by defining a plurality of grooves in the output surface 152.

Each of the micro-structures 155 may have a triangular, trapezoidal, or hemicycle-shaped cross section taken in the YZ-plane. In the illustrated embodiment, the cross section of each micro-structure 155 is a triangle. A vertex angle $\theta$ of the triangle is preferably equal to or larger than 33 degrees. Each micro-structure 155 includes a first surface 155A, and a second surface 155B adjoining the first surface 155A. The first surface 155A is located at a side of the micro-structure 155 farther away from the central axis M. The second surface 155B is located at the other side of the micro-structure 155 nearer to the central axis M. Preferably, the second surface 155B is parallel to the XZ-plane. In the illustrated embodiment, the second surface 155B of each micro-structure 155 adjoins the first surface 155A of the neighboring micro-structure 155. In alternative embodiments, the second surface 155B of each micro-structure 155 can be adjacent to the first surface 155A of the neighboring micro-structure 155 but not adjoin such first surface 155A.

The micro-structures 155 are arranged in two groups, which are symmetrically opposite to each other across the central axis M. Thereby, two arrays of micro-structures 15A, 15B are defined at two sides of the central axis M. The micro-structures 155 of the two arrays of micro-structures 15A, 15B are symmetrical relative to each other across the central axis M.

Figure 3:
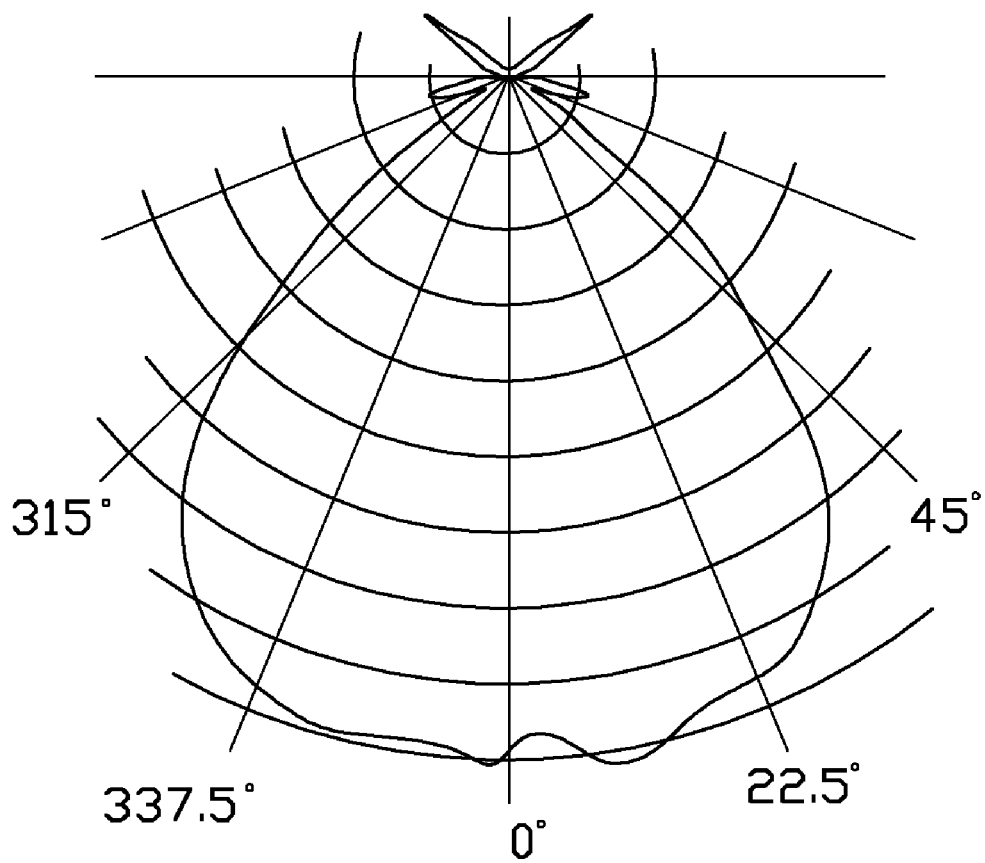
FIG. 3 is a diagram illustrating light intensity distribution of the LED of FIG. 1 after the light has passed through the anti-glare plate.

In operation, when electric current is applied to the LED 11, the LED 11 emits light L. The light L enters the plate 15 through the incident surface 150. The light L then passes through the plate 15 to the micro-structures 155. The micro-structures 155, for example, refract the light L. Thereby, the first and the second surfaces 155A, 155B provide refracted light L that exits the micro-structures 155, with a radiating range of the refracted light L being contracted. In particular, the contraction is in positive and negative Y-axis directions of the Cartesian coordinate system. The Y-axis is perpendicular to the both the X-axis and the Z-axis. Overall, a declination of the light L relative to the central axis M decreases when the light L passes through the micro-structures 155. That is, the radiating range of the output light along the Y-axis directions is reduced. FIG. 3 shows the light intensity distribution of the LED 11 after the light L has passed through the plate 15. The FWHM along the Y-axis is in a range from about 0 degrees to about 45 degrees, and also in a range from about 315 degrees to about 360 degrees. That is, the FWHM of the LED 11 after the light L has passed through the plate 15 is about 90 degrees, which is smaller than the FWHM of the LED 11 before the light L passes through the plate 15 (120 degrees). Therefore, the illumination device 100 has an optimum radiating range suitable for many applications.

Figure 4:
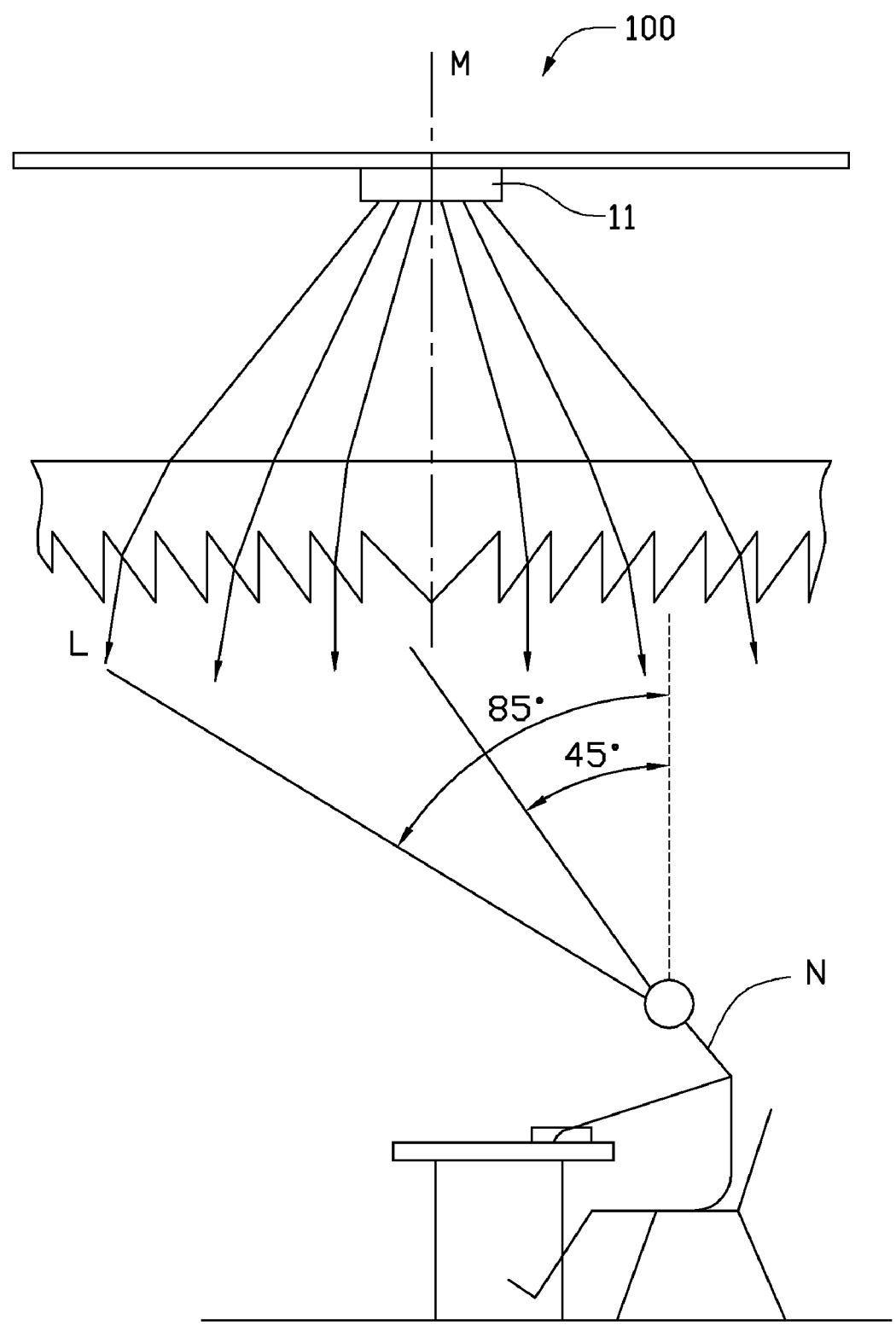
FIG. 4 is similar to FIG. 1, but further showing the illumination device used to provide overhead lighting, thereby achieving anti-glare function.

In a typical application, the illumination device 100 is used to provide overhead lighting, as shown in FIG. 4. Most of the light L emitting from the illumination device 100 is substantially parallel to the central axis M of the LED 11, and a viewing direction of a user N may be in a range from about 45 degrees to about 85 degrees, as measured from the vertical. Thus even when the purview of the user N is in the range from about 45 degrees to about 85 degrees, the light L does not directly enter the eyes of the user N, and glare can be avoided.

Figure 5:
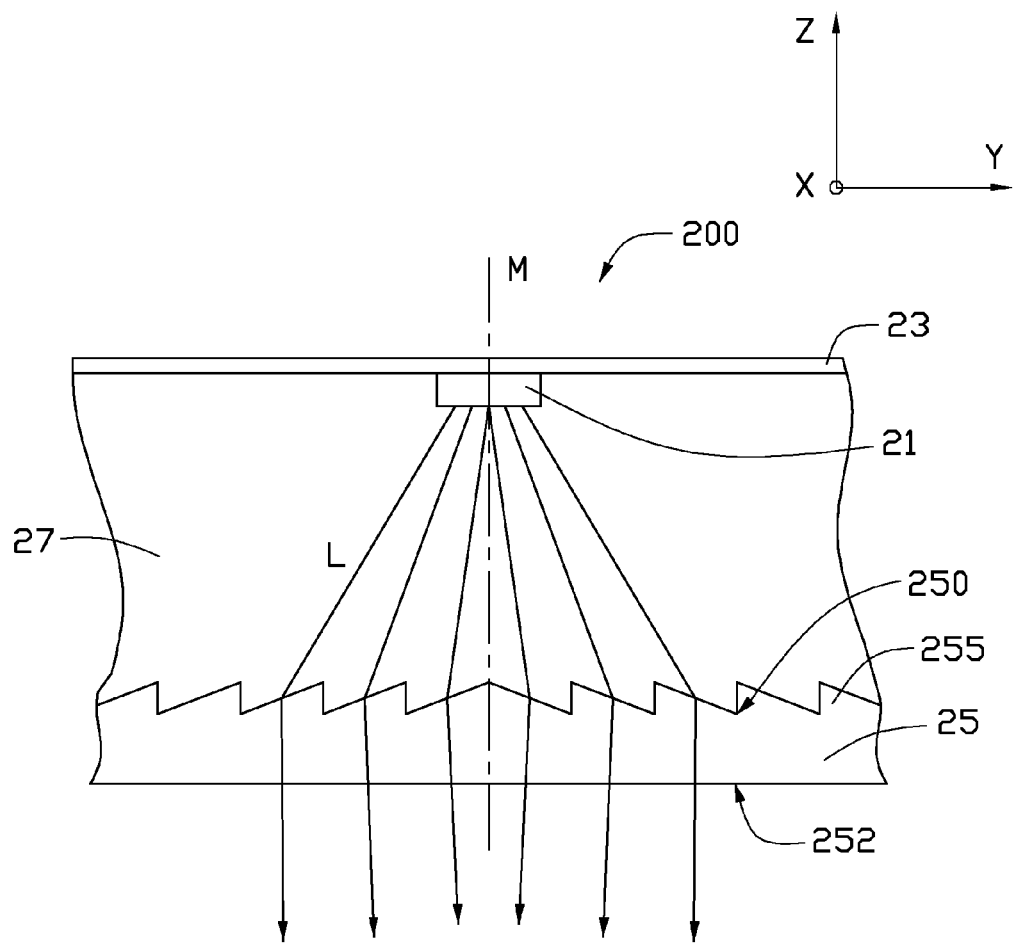
FIG. 5 a side view of an illumination device, according to a second embodiment.

Referring to FIG. 5, an illumination device 200, according to a second embodiment, is shown. The illumination device 200 includes a solid-state light source 21, a substrate 23, and an anti-glare plate 25. The plate 25 includes an incident surface 250 and an output surface 252. The illumination device 200 is similar in principle to the illumination device 100 of the first embodiment. However, in the illumination device 200, a plurality of micro-structures 255 are formed on the incident surface 250, not on the output surface 252. In addition, a bonding layer 27 is provided to interconnect the solid-state light source 21 and the substrate 23 with the plate 25.

The bonding layer 27 is made of transparent or light-pervious material, such as resin or silicone. In this embodiment, the solid-state light source 21 is a light emitting diode chip 21. The light-pervious layer 27 can be used to encapsulate the light emitting diode chip 21.

Figure 6:
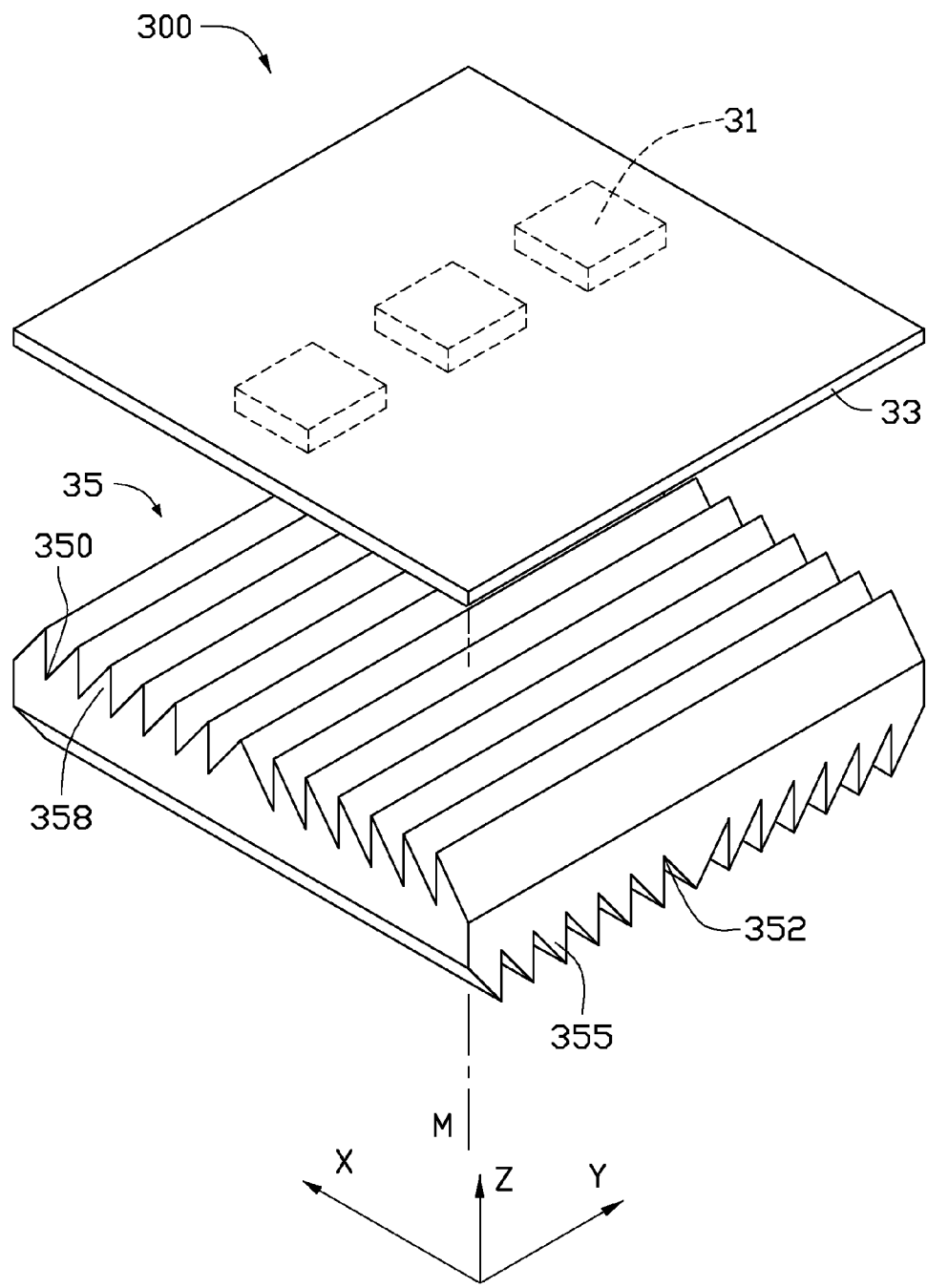
FIG. 6 is an isometric view of an illumination device, according to a third embodiment.
Figure 7:
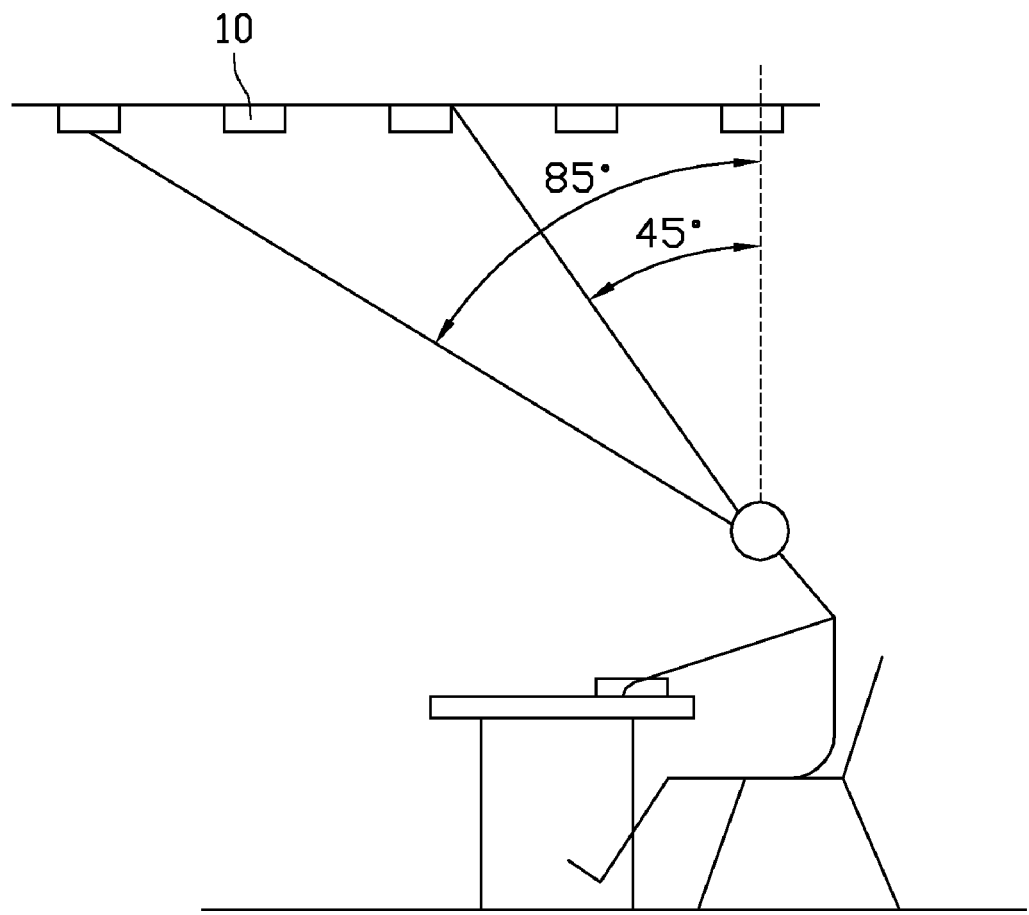
FIG. 7 is a side view illustrating glare that can occur from light of typical LEDs.

FIG. 6 illustrates an illumination device 300, according to a third embodiment. The illumination device 300 is similar to the illumination device 100 of the first embodiment, and includes a solid-state light source (not labeled), a substrate 33, and an anti-glare plate 35. The plate 35 includes an incident surface 350 and an output surface 352 at opposite sides thereof. A plurality of elongated first micro-structures 355 are formed on the output surface 352. Each of the first micro-structures 355 extends parallel to the X-axis. The illumination device 300 differs from the illumination device 100 in that the plate 35 further has a plurality of second micro-structures 358 formed on the incident surface 350. Each of the second micro-structures 358 extends parallel to a Y-axis. In addition, the solid-state light source (not labeled) includes a plurality of LEDs 31, which are arranged on the substrate 33 in a line parallel to the Y-axis. In the illustrated embodiment, there are three LEDs 31.

The shapes and the arrangement of the second micro-structures 358 formed on the incident surface 350 are similar to those of the first micro-structures 355 formed on the output surface 352, except that each of the second micro-structures 358 extends parallel to the Y-axis, whereas each of the first micro-structures 355 extends parallel to the X-axis. That is, each of the second micro-structures 358 is arranged perpendicular to each of the first micro-structures 355.

The first micro-structures 355 contract a radiating range of the output light along positive and negative Y-axis directions. The second micro-structures 358 contract the radiating range of the output light along positive and negative X-axis directions. Thus, glare can be avoided in both X-axis directions and Y-axis directions.

It can be understood that the above-described embodiments are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. An illumination device comprising:
a solid-state light source configured for generating light, the solid-state light source defining a central axis; and
an anti-glare plate arranged generally adjacent to the solid-state light source, the plate comprising an incident surface and an output surface at opposite sides thereof, the incident surface positioned for receiving the light from the solid-state light source, and the output surface being for emission of the light to an outside of the illumination device, one of the incident surface and the output surface having a plurality of parallel elongated first micro-structures each have a length parallel to a first axis of a 3-dimensional coordinate system, the first micro-structures being arranged in two groups at opposite sides of the central axis, the first micro-structures of the two groups being symmetrical relative to each other across the central axis, and the first micro-structures configured for contracting a radiating range of the light entering the plate, the contraction of one of the groups of first micro-structures being along one direction of a second axis of the 3-dimensional coordinate system, the contraction of the other group of first micro-structures being along an opposite direction of the second axis, the second axis being substantially perpendicular to the first axis;
wherein the other one of the incident surface and the output surface has a plurality of elongated second micro-structures formed thereon, each of the second micro-structures has a length parallel to the second axis, and the second micro-structures are configured for contracting the radiating range of the light entering the plate, such contraction being along respective opposite directions of the first axis.

2. The illumination device of claim 1, wherein the incident surface and the output surface are substantially parallel to each other.

3. The illumination device of claim 1, wherein the second micro-structures are arranged in two groups at opposite sides of the central axis, the second micro-structures of the two groups being symmetrical relative to each other across the central axis.

4. The illumination device of claim 1, wherein the solid-state light source comprises at least one item selected from the group consisting of a light emitting diode and a light emitting diode chip.

5. The illumination device of claim 1, wherein the central axis of the solid-state light source is a third axis of the 3-dimensional coordinate system and perpendicular to the first and second axes, a cross section of each first micro-structure taken in a plane cooperatively defined by the central axis of the solid-state light source and the second axis is triangular, and a vertex angle of the triangle is in a range equal to or larger than 33 degrees.

6. The illumination device of claim 5, wherein each first micro-structure includes a first surface and a second surface adjacent to the first surface, the first surface is located at a side of the first micro-structure farther away from the central axis of the solid-state light source, the second surface is located at the other side of the first micro-structure nearer to the central axis of the solid-state light source, and the second surface is substantially parallel to a plane cooperatively defined by the central axis of the solid-state light source and the first axis.

7. The illumination device of claim 1, wherein the central axis of the solid-state light source is a third axis of the 3-dimensional coordinate system and perpendicular to the first and second axes, a cross section of each first micro-structure taken in a plane cooperatively defined by the central axis of the solid-state light source and the second axis is one of hemicycle-shaped and trapezoid-shaped.

8. The illumination device of claim 1, further comprising a light-pervious bonding layer, the plate being coupled to the solid-state light source via the bonding layer.

9. The illumination device of claim 8, wherein the bonding layer is made of one of resin and silicone.

10. The illumination device of claim 1, wherein the plate is made of material selected the group consisting of glass, resin, silicone, glass, epoxy, polyethylene terephthalate, polymethyl methacrylate, and polycarbonate.

11. The illumination device of claim 1, further comprising a substrate, the solid-state light source being secured on the substrate.

12. The illumination device of claim 11, wherein the substrate comprises a circuit board.

* * * * *